United States Patent
Hansen

(10) Patent No.: US 9,617,726 B2
(45) Date of Patent: Apr. 11, 2017

(54) BUTT JOINT FLASHING SYSTEM

(71) Applicant: Chad Hansen, Ravensdale, WA (US)

(72) Inventor: Chad Hansen, Ravensdale, WA (US)

(*) Notice: Subject to any disclaimer, the term of this patent is extended or adjusted under 35 U.S.C. 154(b) by 0 days.

(21) Appl. No.: 14/993,899

(22) Filed: Jan. 12, 2016

(65) Prior Publication Data

US 2016/0201315 A1 Jul. 14, 2016

Related U.S. Application Data

(60) Provisional application No. 62/102,493, filed on Jan. 12, 2015.

(51) Int. Cl.
*E04B 1/68* (2006.01)
*B32B 3/02* (2006.01)
*E04B 1/66* (2006.01)
*B32B 7/04* (2006.01)
*B32B 1/08* (2006.01)
*B32B 3/28* (2006.01)
*B32B 5/18* (2006.01)

(52) U.S. Cl.
CPC ............. *E04B 1/6803* (2013.01); *B32B 3/02* (2013.01); *B32B 7/045* (2013.01); *E04B 1/665* (2013.01); *B32B 1/08* (2013.01); *B32B 3/28* (2013.01); *B32B 5/18* (2013.01); *B32B 2307/7246* (2013.01); *B32B 2307/7265* (2013.01); *B32B 2419/00* (2013.01)

(58) Field of Classification Search
CPC ......... E04B 1/6803; E04B 1/665; B32B 3/02; B32B 3/28; B32B 5/18; B32B 1/08; B32B 2419/00; B32B 2307/7246; B32B 2307/7265
See application file for complete search history.

(56) References Cited

U.S. PATENT DOCUMENTS

| | | | | |
|---|---|---|---|---|
| 624,758 | A * | 5/1899 | Curtain | F16B 19/004 411/479 |
| 4,186,531 | A * | 2/1980 | Okolischan | E04D 13/15 52/11 |
| 5,675,939 | A * | 10/1997 | Hickner | E04D 13/04 52/13 |
| 8,161,689 | B1 * | 4/2012 | Butzen | E06B 1/62 52/58 |
| 8,528,265 | B1 | 9/2013 | Preston | |
| 2003/0230035 | A1 * | 12/2003 | Collins | E04B 1/70 52/209 |
| 2006/0101726 | A1 * | 5/2006 | Collins | E06B 1/62 52/58 |

FOREIGN PATENT DOCUMENTS

CA 2683302 A1 * 4/2010 ........... E04B 1/7046

\* cited by examiner

*Primary Examiner* — Jeanette E Chapman
(74) *Attorney, Agent, or Firm* — Seed IP Law Group LLP

(57) ABSTRACT

A butt joint flashing system is provided that includes a butt joint flashing have a pair of funnels formed at the bottom of one side of the flashing and a coupling corner formed at an upper corner of the flashing to enable attaching multiple sheets of flashing to a utility belt and a perforated line that facilitates easy dispensing of the flashing one sheet or multiple sheets a time. An end joint flashing is also provided that includes a funnel and a coupling corner along with an upright end wall with closed cell foam on the interior to protect from water.

7 Claims, 7 Drawing Sheets

BUTT JOINT FLASHING SYSTEM

BACKGROUND

Technical Field

The present disclosure pertains to flashing used with siding on structures and, more particularly, to a unique design for butt joint flashing and system of dispensing the flashing.

Description of the Related Art

When siding is installed during the construction process for residential and commercial buildings, there are many instances in which two adjoining boards have a gap between them. When two boards of the siding butt up to each other, this is known as a butt joint. FIG. 1 illustrates a butt joint 10 formed at the intersection of two siding boards 12 and 14 along with an upper board 16 and lower board 18, shown for illustrating the environment of the butt joint 10. The first siding board 12 has a terminal end 20 and the second siding board 14 has a corresponding terminal end 22 that butts up against the terminal end 20 of the first siding board 12 to form a vertical seam 24. The siding boards 12, 14 are subject to expansion and contraction due to exposure to heat and rain over time, which can cause gaps in the seam 24 at the butt joint 10. These gaps can allow water, snow, and other undesirable elements to get behind the siding boards 12, 14, and 18 and cause deterioration and corrosion of the underlying structure.

To prevent the seam 24 of the butt joint 10 from causing water damage, it is industry standard to layer a piece of felt paper, flashing paper, or even aluminum behind the butt joint 10 so that any liquid or water that enters will flow downward and away from the interior of the siding structure. While this should work in theory, there are several problems that arise which can cause existing methods to fail. For example, when installers cut their own butt joint flashings, they can be inaccurate in the size and shape, and this can also become labor intensive and expensive. In addition, flashing paper does not protect the butt joint 10 from water as well as previously thought. Moreover, pre-cut and effective butt joint flashings can be expensive and unwieldy in the installation process.

Existing products on the market include a joint flashing that is basically a large pad of pre-cut flashing paper and belt clip to clip the pad on to a belt. FIG. 2 illustrates an existing pre-cut flashing paper 30 having a general rectangular shape. This pre-cut flashing paper 30 has the same disadvantages of hand cutting butt joint flashing paper in that water has been found to flow sideways across the flashing paper 30 and into the siding construction, which can compromise the integrity of the siding. Another approach has been to form the flashing out of pre-cut and treated aluminum. While aluminum has been found to slow water from going sideways, this is a very expensive and unwieldy approach. It has been demonstrated that both paper flashings and aluminum flashings, similar to those shown in FIG. 2, fail to adequately address the need of preventing water from getting through the seam 24 of the butt joint 10 shown in FIG. 1. Moreover, present day flashings fail to consider the needs of the installer who must transport, carry, position, and install the flashing so that it forms an effective seal.

BRIEF SUMMARY

The present disclosure is directed to a unique butt joint flashing design and dispensing system in which the butt joint flashing includes a unique funnel design at the corners to effectively stop horizontal water. The flashing sheets can be stacked into groups of 50 that are coupled together with a metal ring at a perforated corner to enable the stack to clip conveniently to a tool belt and to enable quick one-handed tearing of individual flashing sheets from the stack.

In accordance with one implementation of the present disclosure, a butt joint flashing sheet is provided. The butt joint flashing sheet includes a sheet of flashing material having a rectangular or square shape with a width and a centerline dividing the width into equal halves, each sheet having a first side and an opposing second side and first and second pairs of corners, the first pair of corners located at a first end of the flashing material on opposing sides of the centerline and the second pair of corners located at a second end of the sheet of flashing material on opposing sides of the centerline, each of the second pair of corners folded over onto the first side of the sheet of flashing material to form a pair of funnels, each funnel having an open top to collect liquid and an open bottom to drain liquid, and one of the first pair of corners comprising a coupling corner having a perforation extending from a terminal end of the corner to an opening formed in the coupling corner to enable a user to separate the coupling corner from an attachment device.

In accordance with another aspect of the present disclosure, a butt joint flashing system is provided that includes a plurality of flashing members, each flashing member having a coupling corner with at least one opening formed in the coupling corner and a perforation line formed from the opening to an external edge of the coupling corner, and each flashing member having two opposing corners at a bottom of the flashing member that are folded over and attached to a side of the flashing member to form opposing funnels; and an attachment member sized and shaped to extend through the opening in the coupling corner of each flashing member and to couple to a utility belt.

In accordance with a further aspect of the present disclosure the coupling corner comprises a perforated line extending diagonally across the corner from adjacent edges of the flashing sheet to enable a user to separate the coupling corner from the remainder of the flashing member so that the coupling corner remains on the attachment member.

In accordance with another aspect of the present disclosure, an end joint flashing is provided, which includes a sheet of flashing having an exterior face, a side wall extending from the exterior face and having an interior face, a strip of closed cell foam attached to the interior face of the side wall, and a funnel structure having an open top side and an open bottom side and structured to channel liquid from the open top side to the open bottom side. Ideally the funnel structure is formed from a folded corner of the sheet of flashing and attached to the exterior face.

In accordance with still yet another aspect of the present invention, a system is provided that includes a support structure comprising sheathing, a butt joint flashing attached to the sheathing, an end joint flashing attached to the sheathing, and first, second and third sidings attached to the sheathing. The butt joint flashing includes a sheet of flashing material having a rectangular or square shape with a width and a centerline dividing the width into equal halves with first and second pairs of corners, the first pair of corners situating at a top of the flashing material on opposing sides of the centerline and the second pair of corners situated at the bottom of the sheet of flashing material on opposing sides of the centerline and folded over onto a first side of the sheet of flashing material to form a pair of funnels, each funnel having an open top to collect liquid and an open bottom to drain liquid, and one of the first pair of corners comprising a coupling corner having a perforation extending from a terminal end of the corner to an opening formed in the coupling corner to enable a user to separate the coupling corner from an attachment device.

The end joint flashing is attached to the sheathing and includes a sheet of flashing having an exterior face; a side wall extending from the exterior face and having an interior face; a strip of closed cell foam extending from the interior face of the side wall; and a funnel structure formed from a folded corner of the sheet of flashing and attached to the exterior face, the funnel structure and having an open top side and an open bottom side and structured to channel liquid from the open top side to the open bottom side. The first and second sidings are attached to the sheathing with a first end of the first siding and a first end of the second siding in an abutting relationship to form a butt joint, the butt joint flashing attached to the sheathing and positioned between the butt joint and the sheathing. The third siding is attached to the sheathing and includes a first end that is positioned on the end joint flashing in an abutting relationship with the strip of closed cell foam.

In accordance with yet a further aspect of the present disclosure, a system is provided that includes a butt joint flashing that has a sheet of flashing material having: an exterior face with opposing first and second sides formed in a geometric shape with a height and a width; a centerline dividing the width into equal halves; first and second pairs of corners, the first pair of corners located at a first end of the flashing material on opposing sides of the centerline and the second pair of corners located at a second end of the sheet of flashing material on opposing sides of the centerline; a pair of funnels, each funnel formed at a respective corner of the second pair of corners, each funnel having an open top to collect liquid and an open bottom to drain liquid; and one corner of the first pair of corners comprising a coupling corner having a perforation extending from a terminal end of the corner to an opening formed in the coupling corner to enable a user to separate the coupling corner from an attachment device. The system also includes an end joint flashing that has a sheet of flashing having: an exterior face; a side wall extending from the exterior face, the sidewall having an interior face; a strip of foam attached to the interior face of the side wall; and a funnel structure formed on the exterior face, the funnel structure having an open top side and an open bottom side and structured to channel liquid from the open top side to the open bottom side.

As will be readily appreciated from the foregoing, the butt joint flashing and the end joint flashing include a unique funnel design to block horizontal water and channel water downward, and a perforated corner and ring design for easy carrying and dispensing.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings, wherein.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or components or both associated with the environment of the present disclosure, including but not limited to the construction of the siding boards, fasteners used to install the siding boards, and the structural support for the siding boards and the butt joint flashing, have not been shown or described in order to avoid unnecessarily obscuring descriptions of the embodiments.

Unless the context requires otherwise, throughout the specification and claims that follow, the word "comprise" and variations thereof, such as "comprises" and "comprising" are to be construed in an open inclusive sense, that is, as "including, but not limited to." The foregoing applies equally to the words "including" and "having."

Reference throughout this description to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Figure 1:
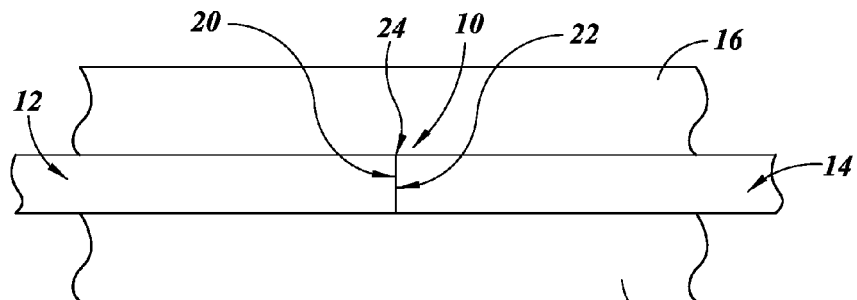
FIG. 1 illustrates a second of siding having a butt joint formed by the juxtaposition of two terminal ends of adjacent siding boards.
Figure 2:
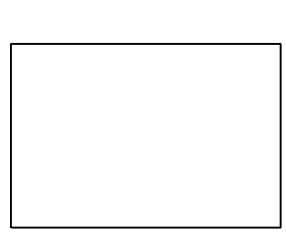
FIG. 2 is a plan view of a known sheet of flashing material for use with the butt joint shown in FIG. 1.
Figure 3:
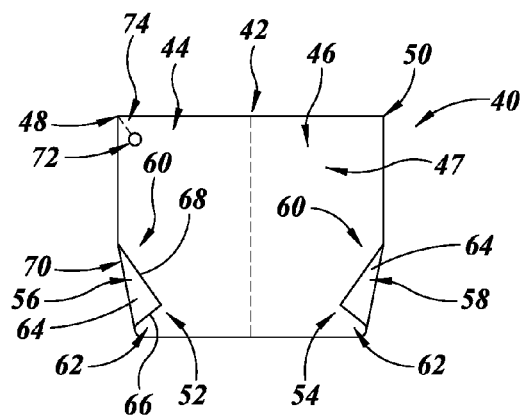
FIG. 3 is a plan view of a butt joint flashing formed in accordance with the present disclosure.

Referring initially to FIG. 3, shown therein is a plan view of a butt joint flashing sheet 40 formed in accordance with the present disclosure. The flashing 40 is constructed from a material similar to flashing paper, which can include a UV or similar weather resistant coating. It has a substantially rectangular or square shape with a width and includes a visible centerline 42 that divides the width into two equal halves 44, 46. The flashing 40 has an exterior side or surface 47, and the centerline 42 can be indicia printed on the exterior side 47 or a crease or other visible indicator to a user of where the center of the width is located on the exterior side 47. The centerline 42 is designed to enable accurate location of the tear or cut and, when it is perforated or creased or otherwise weakened, is designed to facilitate tearing of the flashing 40 in half by hand.

The flashing 40 includes first and second pairs of corners, with the first pair of corners 48, 50 located on opposite sides of the centerline 42 at the top of the flashing 40, and the second pair of corners 52, 54 located near the bottom the flashing 40, but folded over onto the exterior side 47 of the flashing 40 to form first and second funnels 56, 58. The second corners 52, 54 are preferably folded in and heat pressed onto the exterior side 47 of the flashing 40. Each funnel 56, 58 includes an open top 60 and an open bottom 62 that is in fluid communication with the open top 60. As shown in FIG. 3, the open top 60 is of a much larger size than the open bottom 62 of each funnel 56, 58, to enhance the collection of water flowing across the exterior face 47 of the flashing 40 and to channel it down to the open bottom 62 of each funnel 56, 58.

The exact size and dimensions of the funnels 56, 58 can vary, depending in part on how much of each corner 52, 54 is folded over. In addition, the dimensions can vary for cosmetic reasons, such as aesthetic appeal for packaging and display to consumers. As shown in FIG. 3, each funnel is formed of a right triangular piece or flap of flashing 40 that is folded over so that there is a short base segment 66, a longer side segment 68, and the folded over side or hypotenuse 70. As explained above, the length of each side of the triangular flap 64 will depend on how much of the flashing 40 is folded over. Again, this may depend as well on cosmetic considerations, such as point-of-purchase display to consumers where the corners are pre-folded prior to purchase.

While it is preferred that the funnels 56, 58 be of the same size and orientation, there can be instances where the funnels would each have their own unique size and orientation, depending on its application and on considerations of ornamentation, such as balance, symmetry, and the like.

In a preferred implementation of the present disclosure, the centerline 42 would be visible to a user to facilitate alignment of the flashing 40 and the siding boards 12, 14 so that the centerline 42 is congruent with or coincident with the seam 24 formed at the butt joint 10.

The first corner 48, which is the upper left corner of the flashing 40 shown in FIG. 3, functions as a coupling corner having an opening 72 formed to facilitate attachment of a plurality of flashing sheets 40 to each other and to a tool belt via a ring 78, as described in more detail below. Also shown in FIG. 3 is a perforated line 74 extending from the opening 72 to the first corner 48. The perforated line is sized and shaped to facilitate a user grabbing a single flashing sheet 40 and tearing it off from a ring to which the flashing sheet 40 is mounted.

Figure 4:
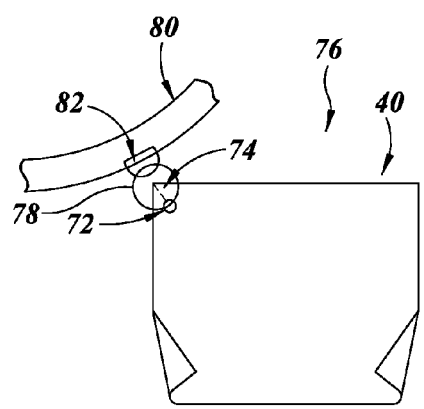
FIG. 4 illustrates a butt joint flashing system in use with a typical utility belt.

Shown in FIG. 4 is a butt joint flashing system 76 that includes the sheet of flashing 40 with a ring 78 extending through the opening 72 and attaching the sheets of flashing 40 to a tool belt 80, which has an existing metal loop 82 extending therefrom. It is to be understood that one or multiple sheets of flashing 40 can be coupled to the ring 78 and hence to the belt 80 via the existing metal loop 82 on the belt 80. The metal ring 78 to which the flashing 40 is attached can be formed of wire or other durable material, and it can have appropriate means for attaching the wire 78 to the loop 82 on the belt 80, which is known to those skilled in the art and will not be described in detail herein. The opening 72 can be drilled through multiple sheets of flashing 40 at a single time to facilitate manufacture, and the perforation lines 74 can be machine cut. As previously described, the second pair of corners 52, 54 can be folded over and heat pressed to the exterior side 47 of the flashing 40, preferably by machine, although it can be done by hand. This would be done prior to purchase by the user, and it can include variations in the dimensions for cosmetic appeal to consumers, such as at point-of-purchase displays.

The manufacture of the flashing sheets 40 can be done with a machine designed to streamline the manufacturing process. Flashing paper is available on large rolls that are then cut to size. The final design of the flashing sheet 40 would be offered in several colors and sizes. The perforations are then cut, the centerline is drawn, and the corners are folded in. A heat press seals the corners to the exterior 47 of the flashing 40 to form the funnels 56, 58. Each sheet of flashing 40 can then be grouped into stacks of 50, drilled, and a length of wire forming a ring placed through the drilled opening 72. The completed stacks are then ready for packaging and shipping.

The method of using the butt joint flashing system of the present disclosure requires determining which size of butt joint flashing is needed. For example, the Hardie™ siding product requires a three-inch overlap on each side of a butt joint. For this installation a nine inch by nine inch stack of flashings 40 would be the best fit. Users or "siders" would install the flashing sheets 40 much like other butt joint flashings; however, the flashings 40 of the present disclosure are directional and the folded corners must be facing downwards to be effective, i.e., the second pair of corners 52, 54 must be vertically lower than the first pair of corners 48, 50.

Figure 5:
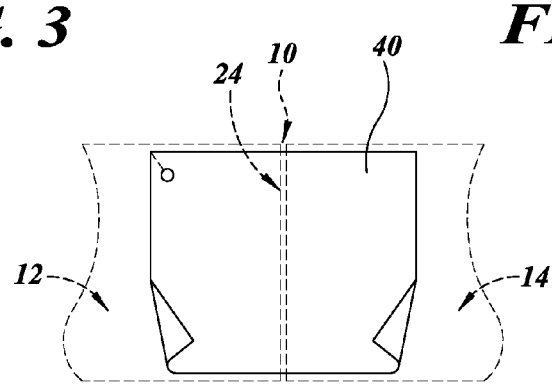
FIG. 5 illustrates the butt joint flashing of FIG. 3 installed behind a siding butt joint.

FIG. 5 illustrates the flashing 40 installed behind the siding boards 12, 14 (shown in phantom) where the centerline 42 is aligned with the butt joint 10 so that the seam 24 is essentially centered over the flashing 40. As will be readily appreciated, a primary advantage to this unique butt joint flashing sheet 40 is higher performance at a lower cost. A secondary advantage is that the combination of the ring with the perforated corner facilitates use by the user or sider in terms of being able to carry a stack of flashings 40 and easily grasp and remove them from the ring 78.

Figure 6:
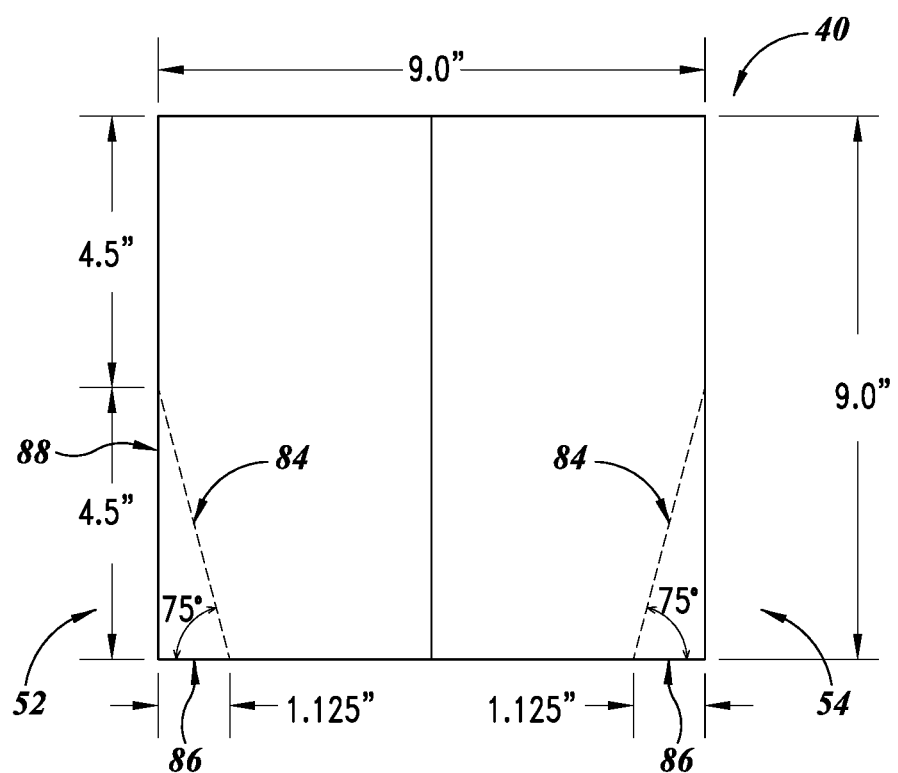
FIG. 6 illustrates the butt joint flashing of FIG. 3 with representative dimensions and angles of the design.
Figure 7:
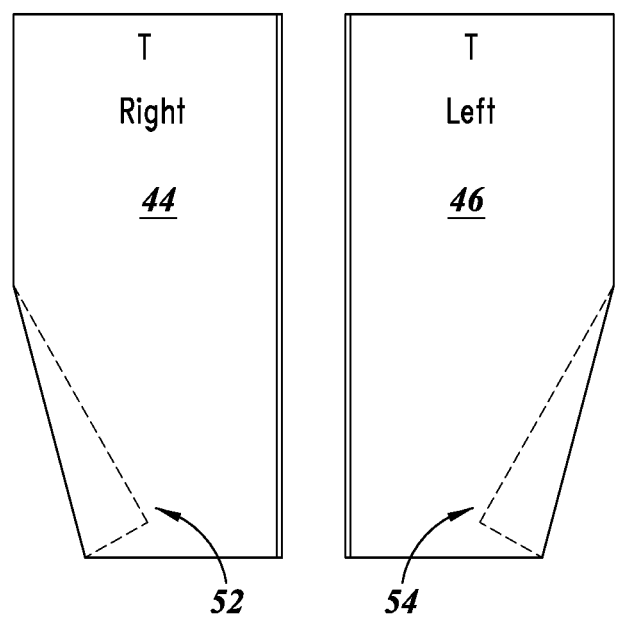
FIG. 7 illustrates the flashing halves separated from each other to form a right flashing and left flashing that are mirror images of each other.

Referring next to FIGS. 6 and 7, shown therein are representative implementations of the present disclosure. For sake of convenience, the same reference numbers used in previous Figures for the same components will be used in FIGS. 6 and 7. In FIG. 6, dimensions and angles of the design are provided. Here, the flashing 40 has a square shape of 9 inches by 9 inches. The second pair of corners 52, 54 are folded along a fold line 84 that forms the hypotenuse of a right triangle in which the base 86 is about 1⅛ inches and the height 88 is 4½ inches. This makes the hypotenuse or fold line 84 about 4.64 inches.

Alternatively, the fold line 84 will form an angle at the base 86 in the range of 75 degrees to 90 degrees. The inventors have tested angles ranging from 75° to 90°. All angles tested worked fine under normal circumstances, and it was found that the flashing with an approximately 75° fold performed best when pushed to extremes. However, a shallower angle would also be effective.

In accordance with another aspect of the present disclosure, the base 86 can be formed to have a length of up to 1.0 inch. The effective range of the base 86 would depend on the size of the flashing produced. Assuming a symmetrical flashing 9" wide, the base 86 is ideally 1⅛ inches long, and the effective range of the base 86 would be in the range from 0.5 inch to 2.0 inches.

In accordance with still yet another aspect of the present disclosure, the height 88 of the triangle formed by the two folded corners 52, 54, is in the range of 4.5 inches and greater, up to the 9 inches. Ideally the length is 4½ inches, up to a vertical fold where X=90°. Shorter lengths would have diminishing effectiveness.

FIG. 7 illustrates the flashing halves 44, 46 separated from each other to form a right flashing 44 and left flashing 46 that are mirror images of each other. This is the form in which each of the flashings 44, 46 would be installed as described above. Separation can be done by tearing along a perforation or cutting, either prior to or during installation.

Figure 8:
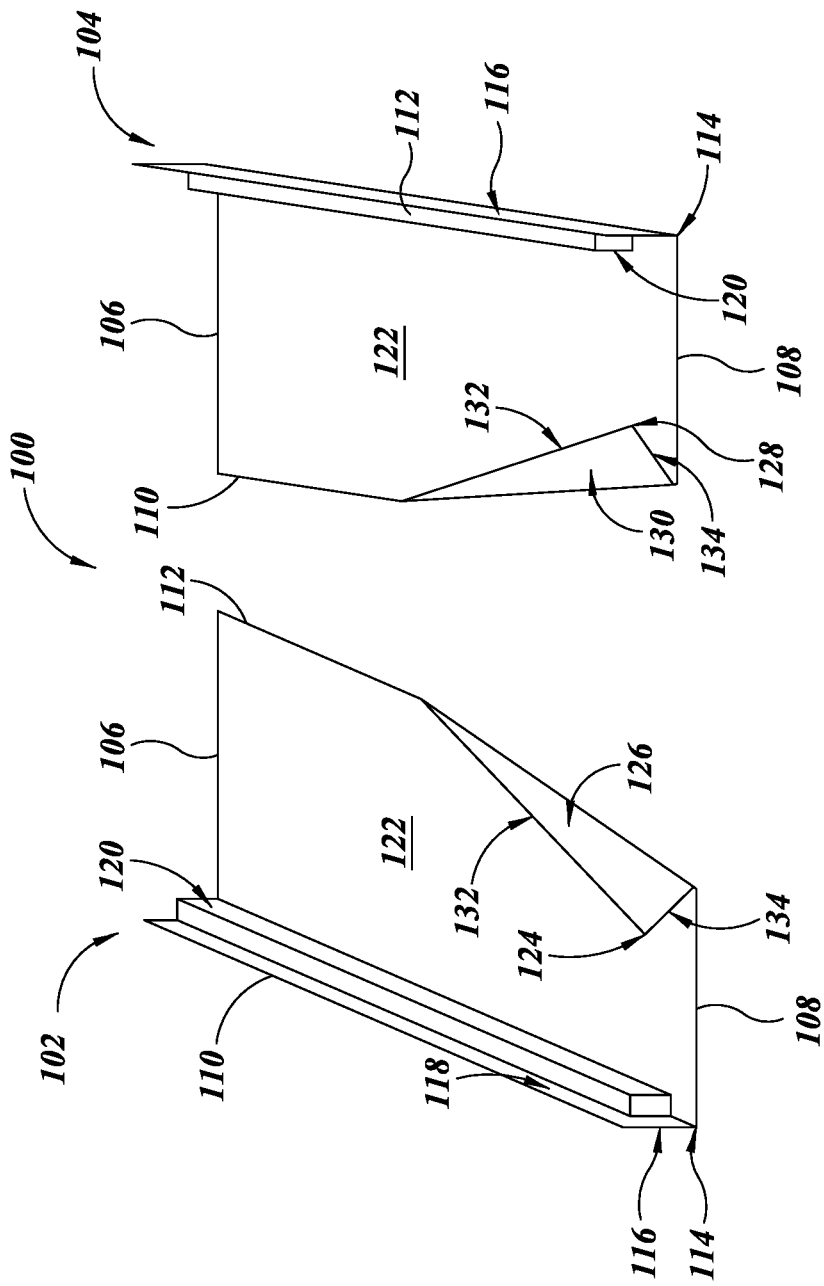
FIG. 8 illustrates an end joint flashing system formed in accordance with the present disclosure.

FIG. 8 illustrates an end joint flashing system 100 formed in accordance with the present disclosure. The system 100 includes left and right end joint flashings 102, 104, respectively, which are formed to be completely separate pieces as shown. Ideally, each end joint flashing 102, 104 is formed from a rectangular piece of flashing paper in which the top and bottom edges 106, 108, respectively, are the shorter sides, and the left and right edges 110, 112, respectively, are the longer sides. Ideally, the dimensions of the shorter sides are in the range of 2 inches to 5 inches and more preferably are 4.5 inches long while the longer sides are in the range of 6 to 12 inches and more preferably are 9 inches long. It is to be understood that these dimensions can vary individually or in combination with each other to adapt to the needs of a particular installation. In addition, code requirements will affect the exact dimensions of the flashings.

For ease and convenience in reading and understanding the present disclosure, most of the features of the right side flashing 104 will have the same reference numbers for features corresponding to identical features in the left side flashing 102 although they are mirror images of each other. These dimensions can vary for ornamental reasons, such as providing an aesthetic appearance for point-of-purchase displays, advertising in print and electronic media, and other displays of the flashing.

On the left flashing 102, the left edge 110 is folded up to create a corner 114 having an upstanding side wall 116 that is ideally orthogonal to an exterior face 122. On an inside face 118 of the upstanding side wall 116 is a strip of closed cell, low density foam material 120 that extends the length of the upstanding side wall 116 and extends down to the exterior face 122 of the end joint flashing 102. While the illustration shows the foam strip of material 120 having a length shorter than the length of the wall to which it is attached, ideally it will be of the same length as the wall to which it is attached.

The structure described above is present in the right side flashing 104, which bears the same reference numbers. Ideally, the upstanding side wall 116 of each end joint flashing 102, 104 has a height in the range of 3/16 inch to 7/16 inch, with a preferred height of 5/16 inch, and the strip of foam 120 has a thickness in the range of 3/16 inch to and including ½ inch and a preferred thickness of about 5/16 inch. Its length will be substantially the length of the upstanding side wall 116, which is the length of the long side described above, and its preferred width will be that of the upstanding side wall 116. The closed cell, low density foam strips 120 are attached to their respective upright walls 116 by adhesive, which adhesive (not shown) is well known in the art and will not be described herein.

FIG. 8 also shows the lower right corner 124 of the left side flashing 102 folded over and attached to the exterior face 122 of the left end joint flashing 102 to form a funnel structure 126, while the lower left corner 128 of the right end joint flashing 104 is folded over and attached to its respective exterior face 122 to form a funnel structure 130. The dimensions and shape of these funnel structures 126, 130 are essentially the same as the dimensions and shape of the funnels 56, 58 described above in connection with the butt joint flashings. Briefly, the funnel structure includes an open top side 132 and an open bottom side 134 that is created by the attachment of the respective corner 124 to the exterior face, such as with adhesive, stapling, or other well-known means of fastening. Ideally the open top side 132 is much longer and larger than the open bottom side 134 to collect water through the open top side 132 and channel it to exit the funnel structure 126, 130 at the open bottom side 134.

Both the left and right end joint flashings 102, 104 are preferably pre-constructed and ready for installation in the field. However, if desired, they may be constructed on the job site and installed as described below.

Figure 9:
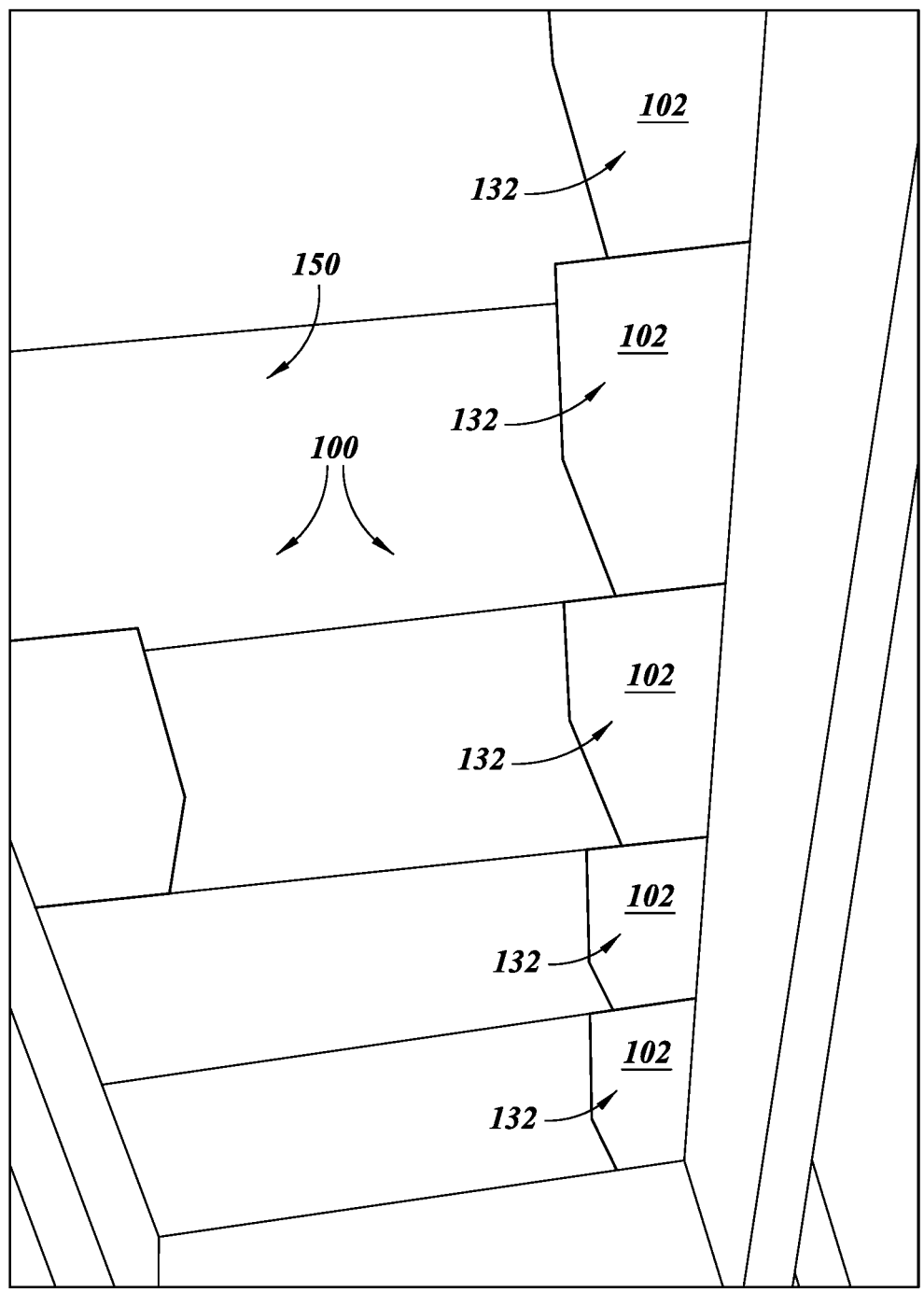
FIG. 9 is an illustration of the end joint flashing system of the present disclosure as viewed from inside the wall with siding attached.

FIG. 9 is an illustration of the end joint flashing system 100 of the present disclosure as viewed from inside a wall with siding 150 attached. On the right side of FIG. 9 can be seen a plurality of left end joint flashings 102 with an interior face 132 visible. A single right end joint flashing 104 is shown on the left side of FIG. 9. When installed, a first end joint flashing 102 is installed at a bottom of the structure, such as on sheathing, with the upstanding wall 116 up against an end face of a supporting structure, such as a stud (not shown). Subsequent higher end joint flashings 102 are layered on top of the lower end joint flashing 102 to partially overlap. In other words the lower portion of an upper end joint flashing 102 overlaps an upper portion of a lower end joint flashing 102. In this way, water flowing through a funnel in an upper end joint flashing 102 will stay on the exterior face 122 of the end joint flashings as the water transits from the upper to the lower end joint flashings.

Figure 10:
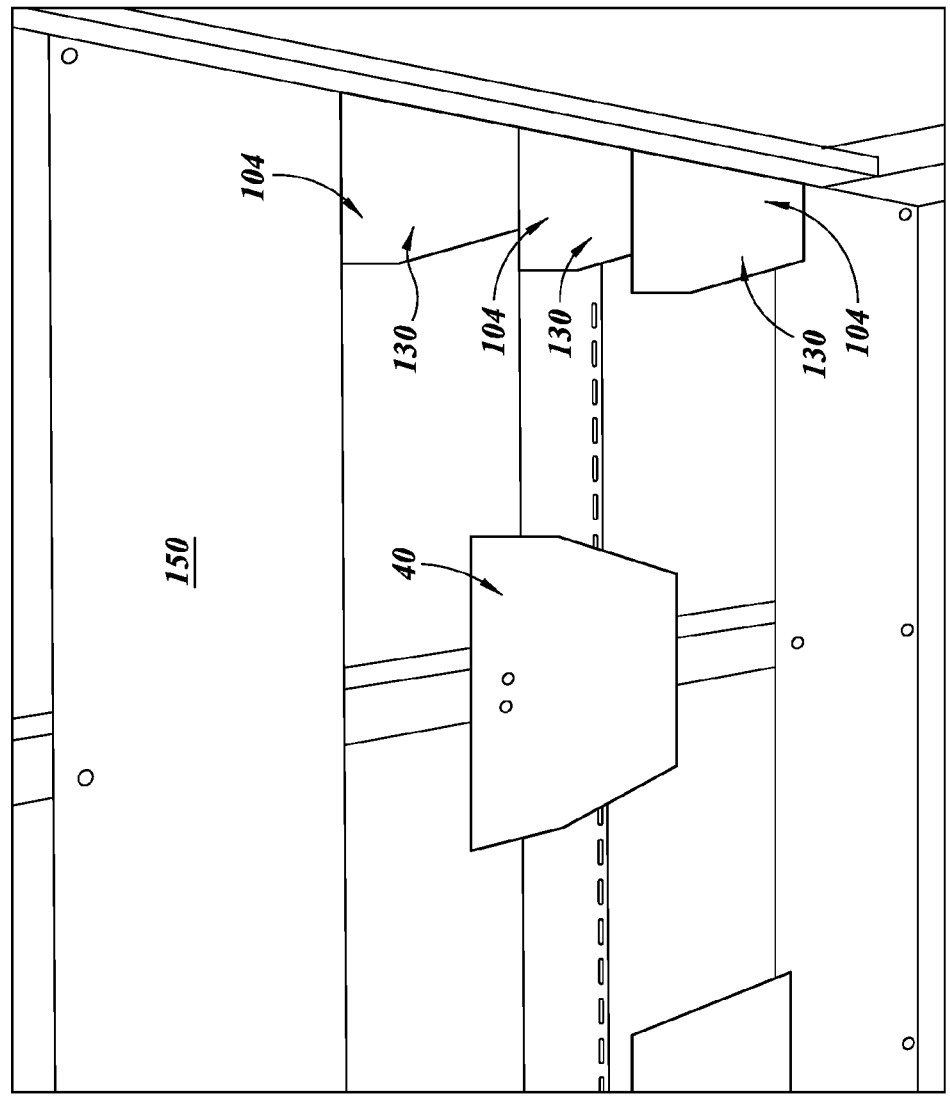
FIG. 10 is an illustration of the butt joint and end joint systems installed on a clear substrate with partial siding to illustrate the relationship of the components.

FIG. 10 is an illustration of the butt joint flashing sheet 40 and end joint system 100 installed on a clear substrate with partial siding 150 to illustrate the relationship of the components. Here, the exterior face 122 of the right end joint flashing 104 is visible with the respective funnel structure 130. As with the left end joint flashings 102, the right end joint flashings 104 are layered from top to bottom on top of each other so that water will traverse the exterior face through the respective funnel structures 130.

Figure 11:
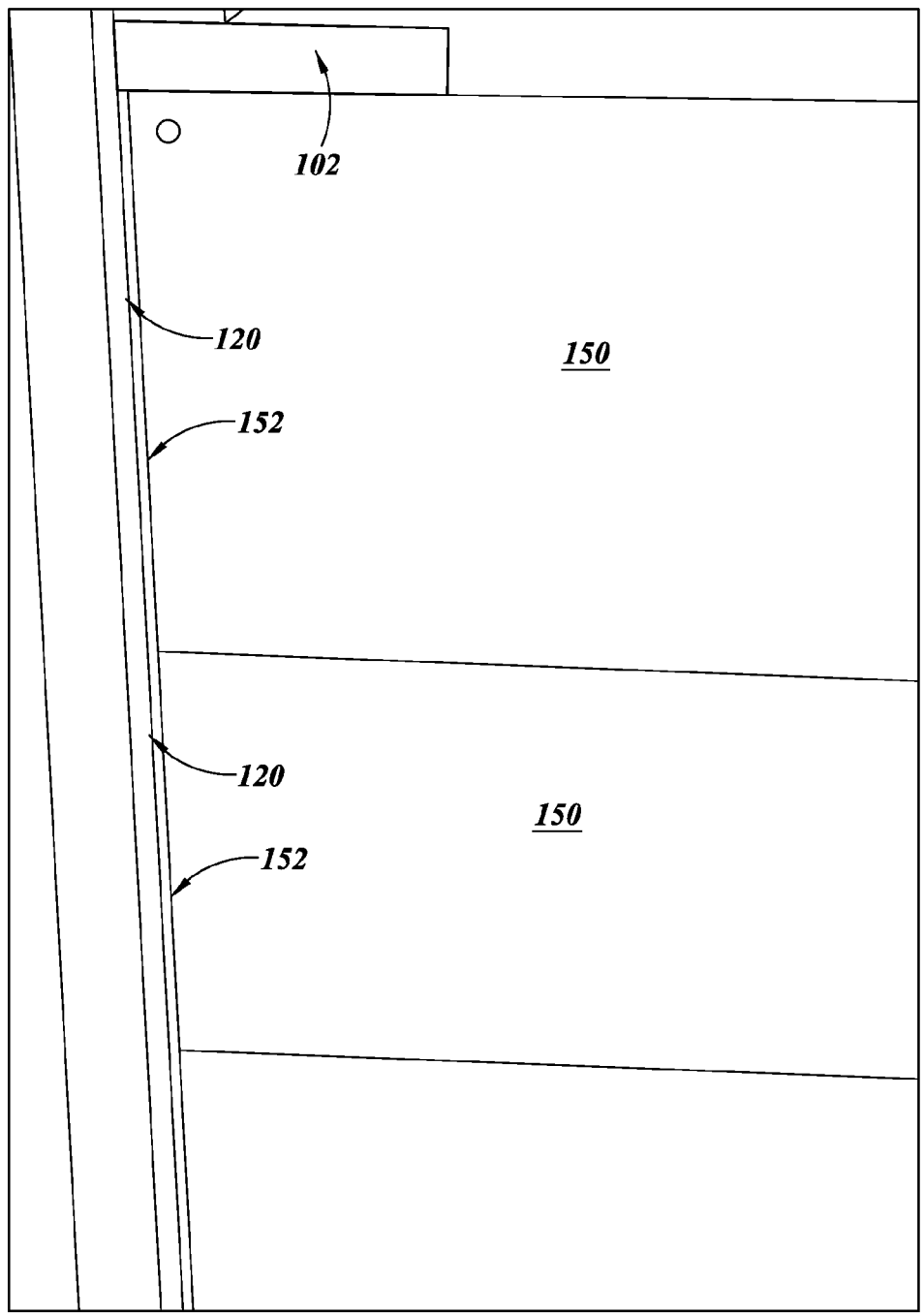
FIG. 11 is an illustration of an exterior of a wall with the siding installed in combination with the end joint flashing in accordance with the present disclosure.

FIG. 11 is an illustration of an exterior of a wall with the siding installed in combination with the end joint flashing in accordance with the present disclosure. Here the siding 150 is installed with the end face 152 of the siding 150 bearing up against the closed foam cell strip 120.

The various embodiments described above can be combined to provide further embodiments. Aspects of the embodiments can be modified, if necessary to employ concepts of the various patents, applications and publications to provide yet further embodiments. For example, two thin, vertical foam strips can be placed on the exterior face 47 of the sheet of flashing 40 to divert water downward, similar to the folded corner and funnel design of the implementation described above. However, this alternative would be at a much higher cost than the unique funnel design of the present disclosure. In accordance with another alternative implementation, the coupling corner on the flashing member can have the perforated line extend diagonally across the corner from one edge to an adjacent edge of the flashing sheet so that the coupling corner can be detached from the remainder of the flashing member and stay attached to the attachment ring.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A butt joint flashing sheet, comprising:
    a sheet of flashing material having a rectangular or square shape with a width and a centerline dividing the width into equal halves, each sheet having a first side and an opposing second side and first and second pairs of corners, the first pair of corners located at a first end of the flashing material on opposing sides of the centerline and the second pair of corners located at a second end of the sheet of flashing material on opposing sides of the centerline, each of the second pair of corners folded over and pressed onto the first side of the sheet of flashing material with only a single fold to form a pair of funnels, each funnel having an open top to collect liquid and an open bottom to drain liquid downward toward the centerline, and one of the first pair of corners comprising a coupling corner having a perforation extending from a terminal end of the corner to an opening formed in the coupling corner to enable a user to separate the coupling corner from an attachment device.

2. The butt joint flashing sheet of claim 1 wherein the centerline comprises a weakened area of the sheet that enables a user to manually tear the sheet along the centerline.

3. An end joint flashing, comprising:
    a sheet of flashing having:
        an exterior face having a rectangular shape with a pair of opposing long sides and a pair of opposing short sides;
        a side wall extending from the exterior face along one of the pair of long sides and having an interior face;
        a strip of closed cell foam attached to the interior face of the side wall; and
        a funnel structure formed from a folded and pressed corner of the sheet of flashing with a single fold line, the funnel structure having an open top side and an open bottom side and structured to channel liquid away from the corner and towards the interior face and to drain downward from the open top side to the open bottom side.

4. A flashing system, comprising:
    a butt joint flashing, comprising:
        a sheet of flashing material having:
            an exterior face with opposing first and second sides formed in a geometric shape with a height and a width;
            a centerline dividing the width into equal halves;
            first and second pairs of corners, the first pair of corners located at a first end of the flashing material on opposing sides of the centerline and the second pair of corners located at a second end of the sheet of flashing material on opposing sides of the centerline;
            a pair of funnels, each funnel formed at a respective corner of the second pair of corners, each funnel having an open top to collect liquid and an open bottom to drain liquid; and
            one corner of the first pair of corners comprising a coupling corner having a perforation extending from a terminal end of the corner to an opening formed in the coupling corner to enable a user to separate the coupling corner from an attachment device; and
    an end joint flashing, comprising:
        a sheet of flashing having:
            an exterior face;
            a side wall extending from the exterior face, the sidewall having an interior face;
            a strip of foam attached to the interior face of the side wall; and
            a funnel structure formed on the exterior face, the funnel structure having an open top side and an open bottom side and structured to channel liquid from the open top side to the open bottom side.

5. The system of claim 4 in which each funnel on the butt joint flashing and each funnel on the end joint flashing are formed from a respective corner being folded over onto the respective exterior face of the flashing material to form a pair of funnels.

6. The system of claim 4, comprising a support structure having sheathing to support the butt joint flashing and the end joint flashing.

7. The system of claim 4 further comprising:
    first and second sidings attached to the sheathing with a first end of the first siding and a first end of the second siding in an abutting relationship to form a butt joint, the butt joint flashing attached to the sheathing and positioned between the butt joint and the sheathing;
    a third siding attached to the sheathing and having a first end that is positioned on the end joint flashing in an abutting relationship with the strip of foam.

* * * * *